(12) United States Patent
Ye

(10) Patent No.: US 9,419,924 B2
(45) Date of Patent: *Aug. 16, 2016

(54) REFERENCE NOTIFICATION METHOD AND APPARATUS

(71) Applicant: Alibaba Group Holding Limited, Grand Cayman (KY)

(72) Inventor: Jun Ye, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 23 days.

This patent is subject to a terminal disclaimer.

(21) Appl. No.: 14/513,465

(22) Filed: Oct. 14, 2014

(65) Prior Publication Data

US 2015/0100654 A1 Apr. 9, 2015

Related U.S. Application Data

(63) Continuation of application No. 13/482,116, filed on May 29, 2012, now Pat. No. 8,892,668, which is a continuation of application No. PCT/US2012/021107, filed on Jan. 12, 2012.

(30) Foreign Application Priority Data

Jan. 20, 2011 (CN) .......................... 2011 1 0030023

(51) Int. Cl.
*G06F 15/16* (2006.01)
*H04L 12/58* (2006.01)
*G06Q 30/08* (2012.01)

(52) U.S. Cl.
CPC ............... *H04L 51/04* (2013.01); *G06Q 30/08* (2013.01); *H04L 51/00* (2013.01); *H04L 51/043* (2013.01); *H04L 51/24* (2013.01)

(58) Field of Classification Search
CPC ....... H04L 51/04; H04L 51/043; H04L 51/00; H04L 51/24; G06Q 30/08
See application file for complete search history.

(56) References Cited

U.S. PATENT DOCUMENTS 8,983,439 B1 * 3/2015 Martin .................... H04L 29/06
455/414.3
2002/0083136 A1 6/2002 Whitten, II
(Continued)

FOREIGN PATENT DOCUMENTS

EP 1585251 10/2005
JP 11272577 10/1999
(Continued)

OTHER PUBLICATIONS

The Chinese Office Action mailed Mar. 5, 2014, for Chinese patent application No. 201110030023.3, a counterpart foreign application of U.S. Appl. No. 13/482,116, 10 Pages.
(Continued)

*Primary Examiner* — Krisna Lim
(74) *Attorney, Agent, or Firm* — Lee & Hayes, PLLC

(57) ABSTRACT

A method and an apparatus of reference notification comprises obtaining an instant message that is sent from a sending user. A contact is selected that satisfies a predetermined criterion from contacts of the sending user. For the selected contact, content is determined that is of interest to the selected contact, and content is found that is of interest and is included in the obtained instant message based on the determined content of interest. Based on the found content of interest, a reference notification message is sent to a contact corresponding to the found content of interest, for notifying the contact that the content of interest is referenced. By using the technical scheme of the present disclosure, the problems of existing technologies that a user cannot accurately and quickly determine whether an instant message references content with which he/she is concerned are solved.

20 Claims, 6 Drawing Sheets

(56) References Cited

U.S. PATENT DOCUMENTS

| | | |
|---|---|---|
| 2004/0111479 A1 | 6/2004 | Borden et al. |
| 2004/0154022 A1 | 8/2004 | Boss et al. |
| 2005/0004984 A1 | 1/2005 | Simpson |
| 2005/0086211 A1 | 4/2005 | Mayer |
| 2006/0029106 A1 | 2/2006 | Ott et al. |
| 2007/0042815 A1 | 2/2007 | Trap |
| 2008/0051064 A1 | 2/2008 | Jones et al. |
| 2008/0167015 A1 | 7/2008 | Vishwanathan et al. |
| 2009/0192970 A1 | 7/2009 | O'Sullivan et al. |
| 2009/0254563 A1 | 10/2009 | Arnold et al. |
| 2009/0254618 A1 | 10/2009 | Arnold et al. |
| 2009/0307325 A1 | 12/2009 | Szeto |
| 2009/0313334 A1 | 12/2009 | Seacat et al. |
| 2010/0017483 A1 | 1/2010 | Estrada |
| 2010/0205539 A1* | 8/2010 | Gestsson ............. G06Q 10/107 715/752 |
| 2010/0235758 A1 | 9/2010 | Shen |
| 2012/0054314 A1* | 3/2012 | Son ........................ H04L 51/04 709/219 |
| 2013/0047104 A1* | 2/2013 | Chen .................... G06F 3/0481 715/765 |

FOREIGN PATENT DOCUMENTS

| | | |
|---|---|---|
| JP | 2000112950 | 4/2000 |
| JP | 2002183064 | 6/2002 |
| JP | 2005050113 | 2/2005 |
| JP | 2007034630 | 2/2007 |
| JP | 2007156534 | 6/2007 |

OTHER PUBLICATIONS

The PCT Search Report and Written Opinion mailed May 8, 2012 for PCT Application No. PCT/US12/21107, 9 pages.

The Extended European Search Report mailed Jul. 18, 2014 for European Patent Application No. 12738786.8, 7 pages.

Office Action for U.S. Appl. No. 13/482,116, mailed on Mar. 27, 2014, Jun Ye, "Reference Notification Method and Apparatus", 18 pages.

Office action for U.S. Appl. No. 13/482,116, mailed on Jul. 29, 2014, Jun Ye, "Reference Notification Method and Apparatus", 6 pages.

The Japanese Office Action mailed Jan. 5, 2016 for Japanese Patent Application No. 2013-551990, a counterpart foreign application of U.S. Pat. No. 8,892,668, 12 pages.

* cited by examiner

REFERENCE NOTIFICATION METHOD AND APPARATUS

CROSS REFERENCE TO RELATED PATENT APPLICATIONS

This application claims priority to and is a continuation of U.S. patent application Ser. No. 13/482,116, filed on May 29, 2012, which is a continuation of an international patent application PCT/US12/21107, filed Jan. 12, 2012, which claims priority from Chinese Patent Application No. 201110030023.3, filed Jan. 27, 2011, entitled "Reference Notification Method and Apparatus," which applications are hereby incorporated by reference in their entirety.

TECHNICAL FIELD

The present disclosure relates to the field of instant messaging and particularly, relates to reference notification methods and apparatuses.

BACKGROUND

With the development of Internet technology, an increasing number of people use the Internet for communication. Instant messaging (IM) technology, which is developed based on Internet communication technology, receives increasing attention and recognition from the public due to characteristics such as real-time, convenience and promptness. A user can exchange instant messages with different contacts using an IM client.

Two users can exchange instant messages through an instant chat. If multiple users want to conduct instant messaging at the same time, a messaging group needs to be formed. For example, a user A, a user B and a user C form a messaging group if the user A, the user B and the user C want to conduct a multi-end chat through respective IM clients. Each instant message sent by a user to the messaging group can be received by other users in the messaging group.

Two problems exist in existing instant messaging technology:

(1) Regardless of instant messaging between two users through an instant chat or instant messaging among multiple users through a messaging group, a user who does not belong to that instant chat or instant group cannot know whether instant messages therein mention any content with which he/she is concerned, e.g., referencing his/her name, referencing a user name of a user with whom he/she is concerned, or referencing a keyword with which he/she is concerned (for instance, referencing a concerned keyword "soccer").

(2) Regardless of instant messaging between two users through an instant chat or instant messaging among multiple users through a messaging group, the number of instant messages exchanged between users may be numerous and cluttered. A user who receives the instant messages may find it difficult to accurately find content with which he/she is concerned from these numerous and cluttered instant messages that are received. If the user who receives the instant messages wants to find the content with which he/she is concerned, the user needs to search the received instant messages one by one. This not only wastes a lot of the user's processing time, but also has a relatively low search efficiency and flexibility. Furthermore, if a large number of users search chat records in an instant messaging server at the same time or a certain user repeatedly searches content with which he/she is concerned in chat records of users who have communicated with the user, an access load of the instant messaging server is increased and a processing capability of the instant messaging server is decreased.

In short, in existing technologies, neither a user who receives an instant message nor a user who does not receive the instant message (i.e., a user who does not belong to an instant chat or an instant group) can accurately and quickly determine whether the instant message references content with which he/she is concerned without increasing an access load of an instant messaging server.

SUMMARY OF THE DISCLOSURE

The present disclosure provides a method and an apparatus of reference notification to solve the problems of existing technologies that a user cannot accurately and quickly determine whether an instant message references content with which he/she is concerned.

In one aspect of the present disclosure, a method of reference notification may obtain an instant message that is sent from a sending user. The method may select one or more contacts that satisfy a predetermined criterion from contacts of the sending user. For the one or more selected contacts, the method may determine respective content that is of interest to the one or more selected contacts. In some embodiments, the method may further find content of interest included in the obtained instant message based on the determined content of interest. In one embodiment, based on the found content of interest, the method may send a reference notification message to a contact that corresponds to the found content of interest to notify the contact that the found content of interest is referenced.

In another aspect of the present disclosure, a reference notification apparatus may include an acquisition unit configured to obtain an instant message that is sent from a sending user. Additionally, the apparatus may further include a selection unit that is configured to select a contact that satisfies a predetermined criterion from contacts of the sending user. In some embodiments, the apparatus may further include a first determination unit. The first determination unit is configured to determine, for the contact selected by the selection unit, content that is of interest to the contact. Furthermore, the apparatus may include a searching unit configured to find content of interest included in the instant message obtained by the acquisition unit based on, for example, the content determined by the first determination unit. In one embodiment, the apparatus may further include a sending unit configured to send, to a contact corresponding to the found content of interest, a reference notification message for notifying the contact that the content of interest is referenced based on the content of interest found by the searching unit.

The exemplary embodiments of the present disclosure obtain an instant message that is sent from a sending user, and select a contact that satisfies a predetermined criterion from contacts of the sending user. Furthermore, the exemplary embodiments may determine, for the selected contact, content that is of interest to the selected contact, and find content of interest included in the obtained instant message based on the determined content. Based on the found content of interest, the exemplary embodiments may send, to a contact corresponding to the found content of interest, a reference notification message for notifying the contact that the found content of interest is referenced.

In one embodiment, if the contact corresponding to the found content of interest includes a user who does not receive the instant message (e.g., a user who does not belong to an associated instant chat or instant group), the user may know that content with which he/she is concerned is referenced in the instant message that is sent by the sending user through the reference notification message. Additionally or alternatively, if the contact corresponding to the found content of interest includes a user who receives the instant message (e.g., a user who belongs to the instant chat or instant group), the user may know in time which instant message references content with which he/she is concerned based on the received reference notification message, and thus may search all instant messages that are received accordingly. This saves the user a lot of processing time, and effectively improves search efficiency and flexibility. Furthermore, as the user will not repeatedly search for content with which he/she is concerned in an instant messaging server, an access load of the instant messaging server will not be increased.

DETAILED DESCRIPTION

Implementation principles, specific implementation methods and achieved advantages of the technical scheme of the exemplary embodiments of the present disclosure are described in detail herein in conjunction with the accompanying figures.

First Embodiment

Figure 1:
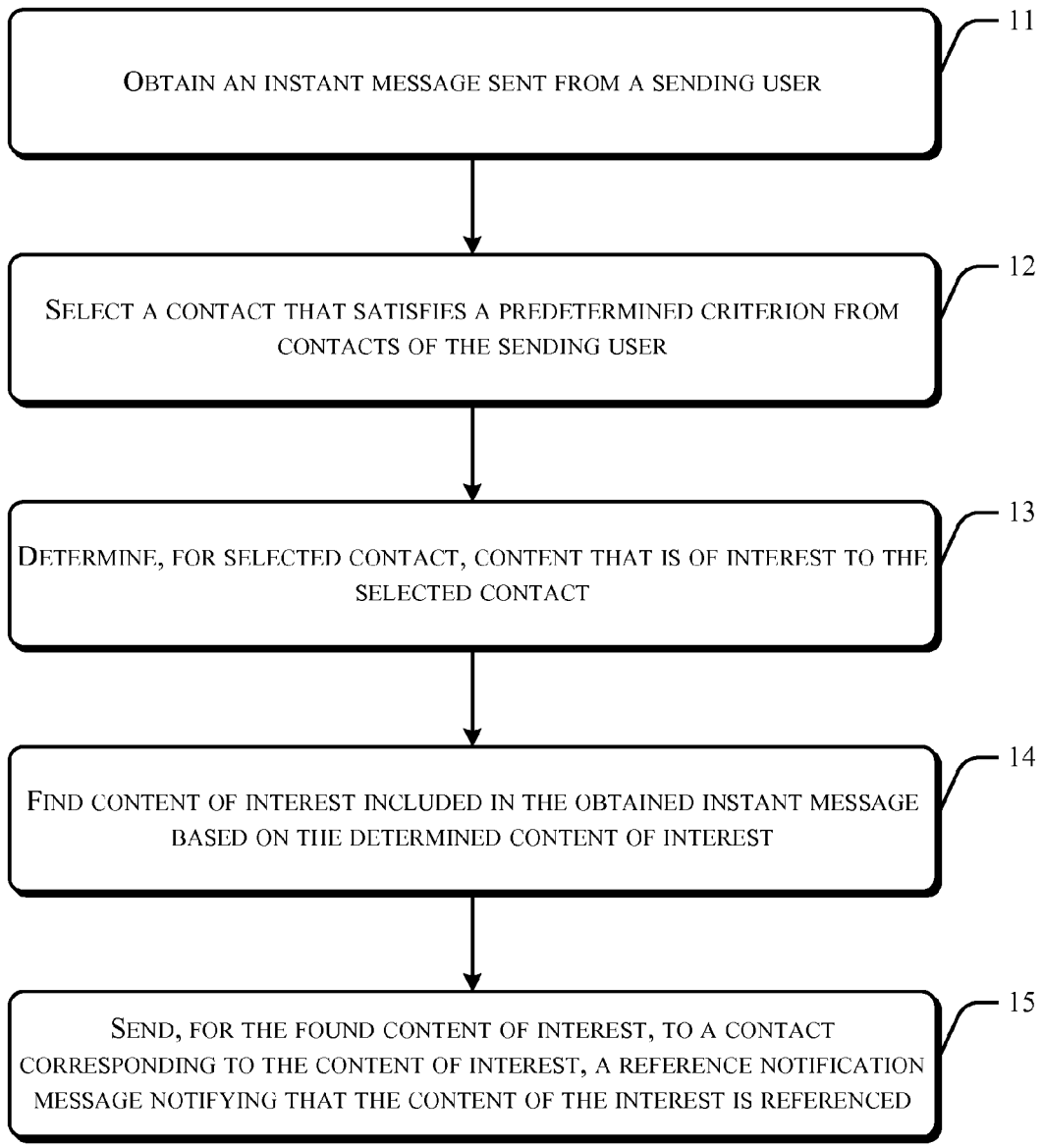
FIG. 1 is a flowchart illustrating a method of reference notification in accordance with a first embodiment of the present disclosure.

FIG. 1 shows a flowchart illustrating a method of reference notification in accordance with the first embodiment of the present disclosure, which includes the following process.

Block 11 obtains an instant message sent from a sending user.

In the first embodiment of the present disclosure, a sending user may send an instant message for an instant chat. This instant message is referred to as an instant chat message. A user who establishes the instant chat with the sending user and receives the instant chat message is referred to as a target receiving user of the instant chat message. Alternatively, the sending user may send an instant message for a messaging group. This instant message is referred to as an instant group message. All users other than the sending user who are included in the messaging group and receive the instant group message are referred to as target receiving users of the instant group message.

An instant message includes a receiver identifier. If the receiver identifier is a user identifier of a certain user, this instant message is determined to be specified for a user corresponding to the user identifier, i.e., the instant message is an instant chat message. If the identifier of the receiver is a group identifier of a messaging group, this instant message is determined to be specified for a messaging group corresponding to the messaging group identifier, i.e., the instant message is an instant group message.

Block 12 selects a contact that satisfies a predetermined criterion from contacts of the sending user.

In the first embodiment of the present disclosure, contacts of the sending user include not only buddies whom the sending user has added when conducting instant messaging (i.e., contacts of a buddy list) but also users of a messaging group in which the sending user has joined.

A method of selecting a contact that satisfies a predetermined criterion may include, but is not limited to, selecting all contacts of the sending user. Additionally or alternatively, the contact selection method may include selecting buddies of the sending user, i.e., contacts within a buddy list. In some embodiments, the contact selection method may additionally or alternatively include determining target receiving users who receive the instant message, and rendering the determined target receiving users as contacts that satisfy the predetermined criterion.

As described above, the first embodiment selects contacts that satisfy a predetermined criterion, who may be target receiving users receiving the instant message (e.g., users who belong to associated instant chat or instant group) or users who do not receive the instant message (e.g., user who do not belong to the instant chat or instant group).

Block 13 determines, for the selected contact, content that is of interest to the selected contact.

The sending user stores content that is of interest to each contact in advance. The content of interest may include, but is not limited to, at least one of the following content: a user identifier of the contact, a user identifier of a concerned user who is of interest to the contact, and a keyword that is of interest to the contact.

For example, if a user A is interested in an instant message that mentions him/her, content that is of interest to the user A includes a user identifier thereof. If the user A is further interested in an instant message that mentions user B, the user B is a user who is of interest to the user A. The content that is of interest to the user A includes a user identifier of the user B. If a user C is interested in an instant message that mentions about "soccer", "soccer" is a keyword of interest to the user C. The content of interest to the user C includes this keyword "soccer". If the user A and the user C both are contacts of a user D, the user D may store the content that is of interest to the user A and the user C using the following but non-limiting tabular format:

| Contact | Content of interest |
| --- | --- |
| User A | User A |
|  | User B |
| User C | soccer |

In an alternative embodiment, the sending user may not store the content of interest to each contact in advance. Instead, the sending user obtains relevant information from an instant messaging server when needing to determine content of interest to a certain contact. In other words, the instant messaging server stores content of interest to each contact therein beforehand.

Block 14 finds content of interest included in the obtained instant message based on the determined content of interest.

The first embodiment of the present disclosure may include, but is not limited to, the following method to find the content of interest: matching information content of the obtained instant message with each determined content of interest; and rendering successfully matched content of interest as content of interest included in the obtained instant message.

Block 15 sends to the contact, for the found content of interest, a contact corresponding to the content of interest, a reference notification message notifying the contact that the content of interest is referenced.

For each found content of interest, a reference notification message to be sent to corresponding contact is first generated. The reference notification message may include information content of the instant message, attribute information of the instant message, or both.

The information content of the instant message may be an entire text or an abstract of the instant message. If the information content is an abstract, the abstract is extracted from the entire text of the instant message according to a predetermined extraction rule.

The attribute information of the instant message may include, but is not limited to, at least one of the following information: the content of interest, a user identifier of the sending user, an information identifier of the instant message, a sending time of the instant message, and a messaging identifier corresponding to the instant message.

If the instant message is an instant chat message for an instant chat, the messaging identifier corresponding to the instant message is a chat identifier of the instant chat. If the instant message is an instant group message for a messaging group, the messaging identifier corresponding to the instant message is a group identifier of the messaging group.

If the contact corresponding to the found content of interest includes a target receiving user who receives the instant message, the user may know which instant message received mentions his/her content of interest based on the received reference notification message, and may search all received instant messages accordingly, thus saving the user a lot of processing time and effectively improving search efficiency and flexibility.

If the contact corresponding to the found content of interest includes a target receiving user who does not directly receive the instant message, and the user cannot search the instant message through chat records, the entire text of the instant message may be attached to the reference notification message and sent to this user.

In order to improve the privacy of the instant message, the first embodiment of the present embodiment proposes that, if the contact corresponding to the found content of interest is not a target receiving user who directly receives the instant message, the sending user may determine whether to send the reference notification message to the contact based on a predetermined character. Specifically:

If the sending user wants to send a reference notification message to a contact who is not a target receiving user of an instant message and the instant message includes content of interest to the contact, the sending user may insert a predetermined character before or after the content of interest. Later, prior to sending the reference notification message to the contact corresponding to the content of interest, a determination is first made as to whether the contact corresponding to the content of interest is a target receiving user of the instant message. If a determination result is negative, a determination is made as to whether the instant message includes a predetermined character that is adjacent to the content of interest. If included, a reference notification message is sent to the contact. If not included, the reference notification message will not be sent to the contact. Adjacency between the predetermined character and the content of interest may include a positioning of the predetermined character before or after the content of interest.

If the contact corresponding to the found content of interest is currently online, the reference notification message may be sent to the contact directly. If the contact is currently offline, the reference notification message may be stored in an instant messaging server first. The instant messaging server detects a status of the contact in real time. Upon detecting that the contact changes from offline to online, the stored reference notification message is sent to the contact. As can be seen, even if the contact is offline, the reference notification message may still be sent to the contact when the contact becomes online, thus improving flexibility of reference notification.

When sending a reference notification message to a contact whose status changes from offline to online, the instant messaging server may need to send multiple reference notification messages to the contact. The instant messaging server may send each reference notification message separately or in combination. A method of sending in combination includes: first determining each reference notification message that needs to be sent to the contact from among all stored reference notification messages, and combining the determined reference notification messages and sending it to the contact. The combined reference notification message may further include the number of the reference notification messages that need to be sent to the contact. As can be seen, the instant messaging server may send multiple reference notification messages at one time, thus saving processing resources of the instant messaging server.

In a messaging group, in order to know accurately which user has been referenced most, the first embodiment proposes recording the number of times that each user in a messaging group is referenced. When a sending user sends an instant message for a messaging group, if the instant message includes information of a user identifier of a certain target receiving user of the messaging group, the number of times that the target receiving user is referenced is increased by one, and each user of the messaging group is notified thereof. An instant messaging client of each user has a display area on a display interface thereof. The display area displays the number of times that each user of the messaging group is referenced. Based on the above notification, the instant messaging client of each user updates the number of times that the target receiving user is referenced in the display area. The display area may further display a reference number of a user which is referenced by all users in the messaging group. As such, users can visually obtain the number of times that each user is referenced, and from which, determine a respective degree of interest of each user.

In this first embodiment, the instant message may be sent to the target receiving users prior to sending the reference notification message to the contacts. Or, the reference notification message may be sent to the contacts prior to sending the instant message to the target receiving users. The reference notification message may be sent to the contacts at the time when the instant message is sent to the target receiving users.

As can be seen from the above process, the technical scheme of the exemplary embodiments of the present disclosure first obtains an instant message that is sent from a sending user, selects a contact that satisfies a predetermined criterion from contacts of the sending user, determines, for the selected contact, content that is of interest to the selected contact, finds content of interest included in the obtained instant message based on the determined content, and based on the found content of interest, sends to, a contact corresponding to the found content of interest, a reference notification message for notifying the contact that the content of interest is referenced. If the contact corresponding to the found content of interest includes a user who does not receive the instant message (e.g., a user who does not belong to associated instant chat or instant group), the user may know that content with which he/she is concerned is referenced in the instant message that is sent by the sending user through the reference notification message. If the contact corresponding to the found content of interest includes a user who receives the instant message (e.g., a user who belongs to the instant chat or instant group), the user may know which instant message references content with which he/she is concerned in time based on the received reference notification message, and thus may search all instant messages that are received accordingly. This saves a lot of processing time of the user, and effectively improves search efficiency and flexibility. Furthermore, as the user will not repeatedly search for content with which he/she is concerned in an instant messaging server, an access load of the instant messaging server will not be increased.

Second Embodiment

Figure 2:
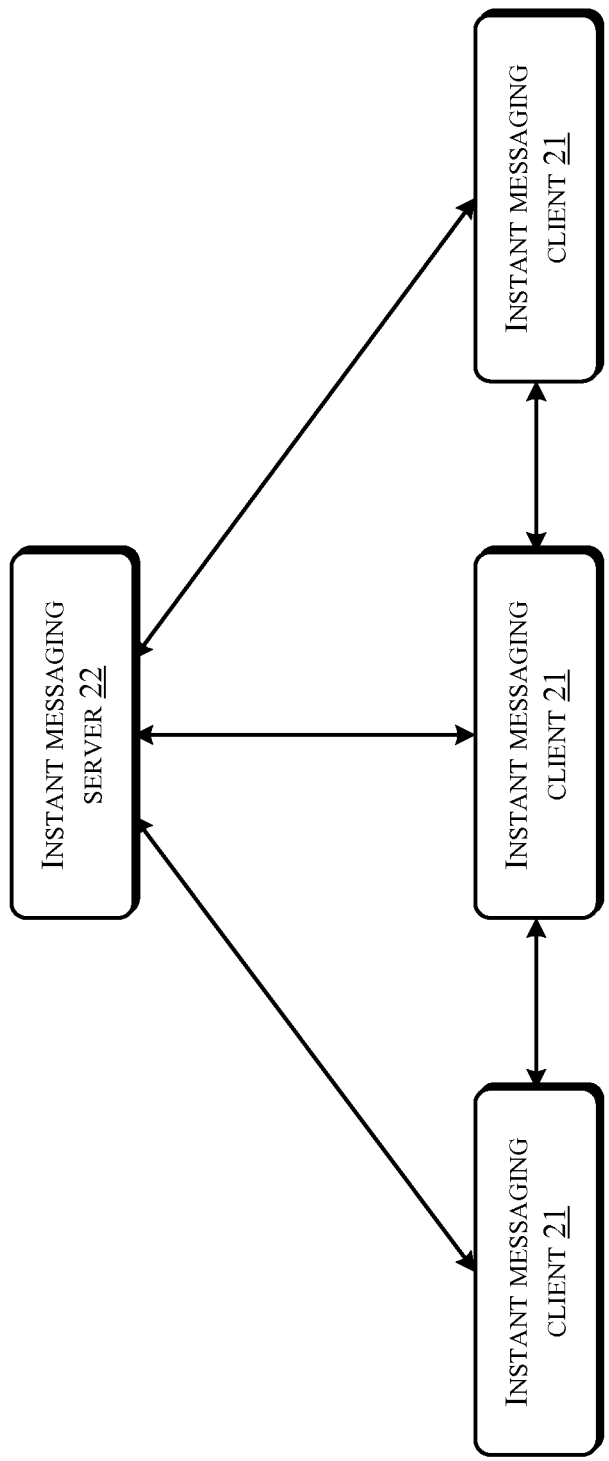
FIG. 2 is a structural diagram illustrating an instant messaging system in accordance with a second embodiment of the present disclosure.

FIG. 2 shows a structural diagram of an instant messaging system in accordance with the second embodiment of the present disclosure, which includes an instant messaging client 21 of each instant messaging user and an instant messaging server 22 at a network side.

Instant messaging users may exchange instant messages through respective instant messaging clients 21. More specifically, an instant messaging client of a sending user of an instant message receives the instant message inputted by the sending user, and sends the instant message to target receiving users based on the a receiver identifier of the instant message.

The instant messaging users may exchange instant messages through the instant messaging server 22. Specifically, an instant messaging client of a sending user of an instant message receives the instant message inputted by the sending user and sends the instant message to the instant messaging server 22. The instant messaging server 22 sends the instant message to target receiving users based on a receiver identifier of the instant message.

In this second embodiment, a reference notification message may be sent by the instant messaging client 21 of a sending user. In other words, an execution entity of blocks 11-15 is the instant messaging client of the sending user. Alternatively, the reference notification message may be sent by the instant messaging server 22. In other words, an execution entity of blocks 11-15 is the instant messaging server 22. These two scenarios are separately described in detail below.

Third Embodiment

Figure 3:
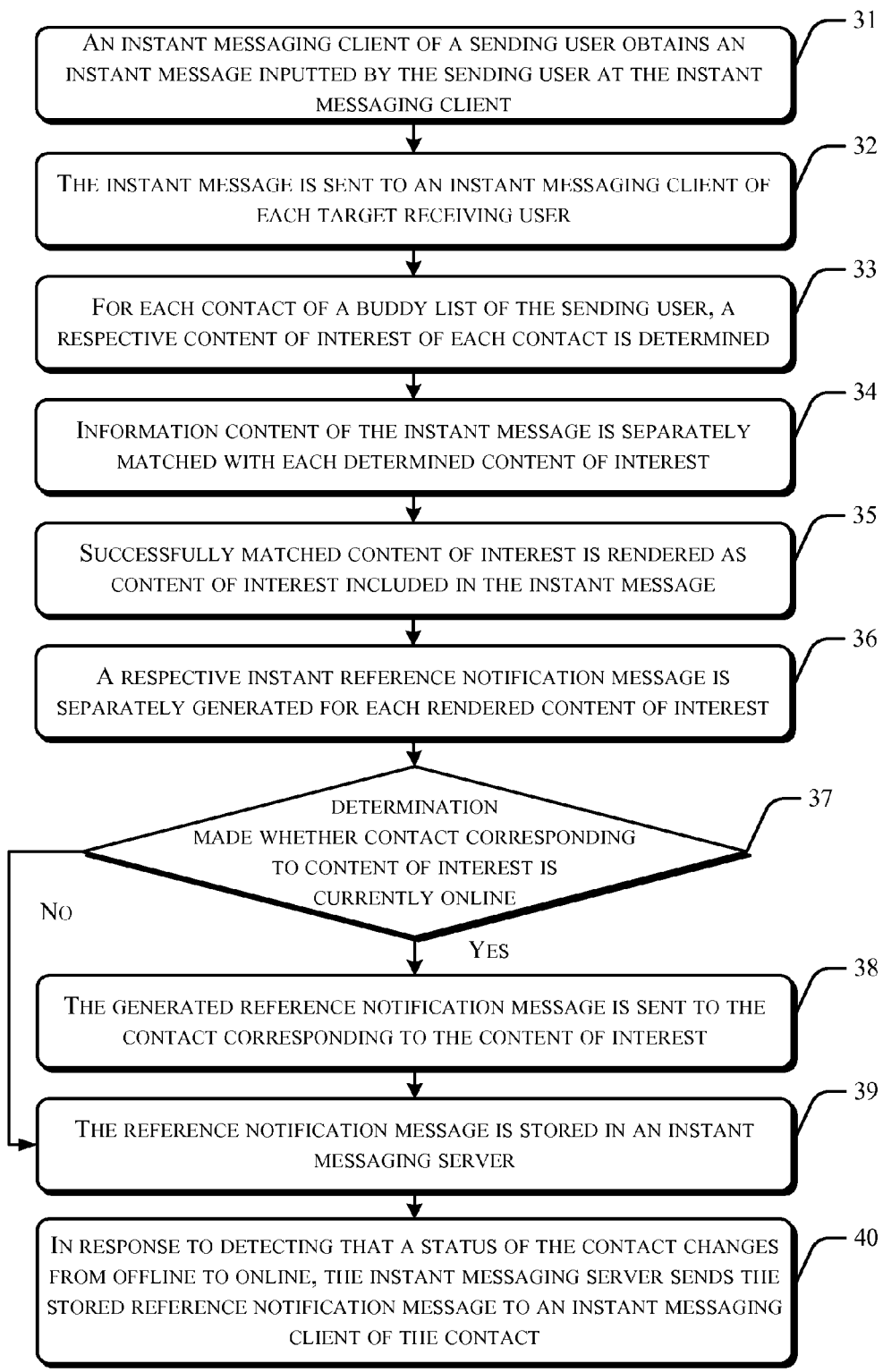
FIG. 3 is a flowchart illustrating a method of reference notification in accordance with a third embodiment of the present disclosure.
Figure 4:
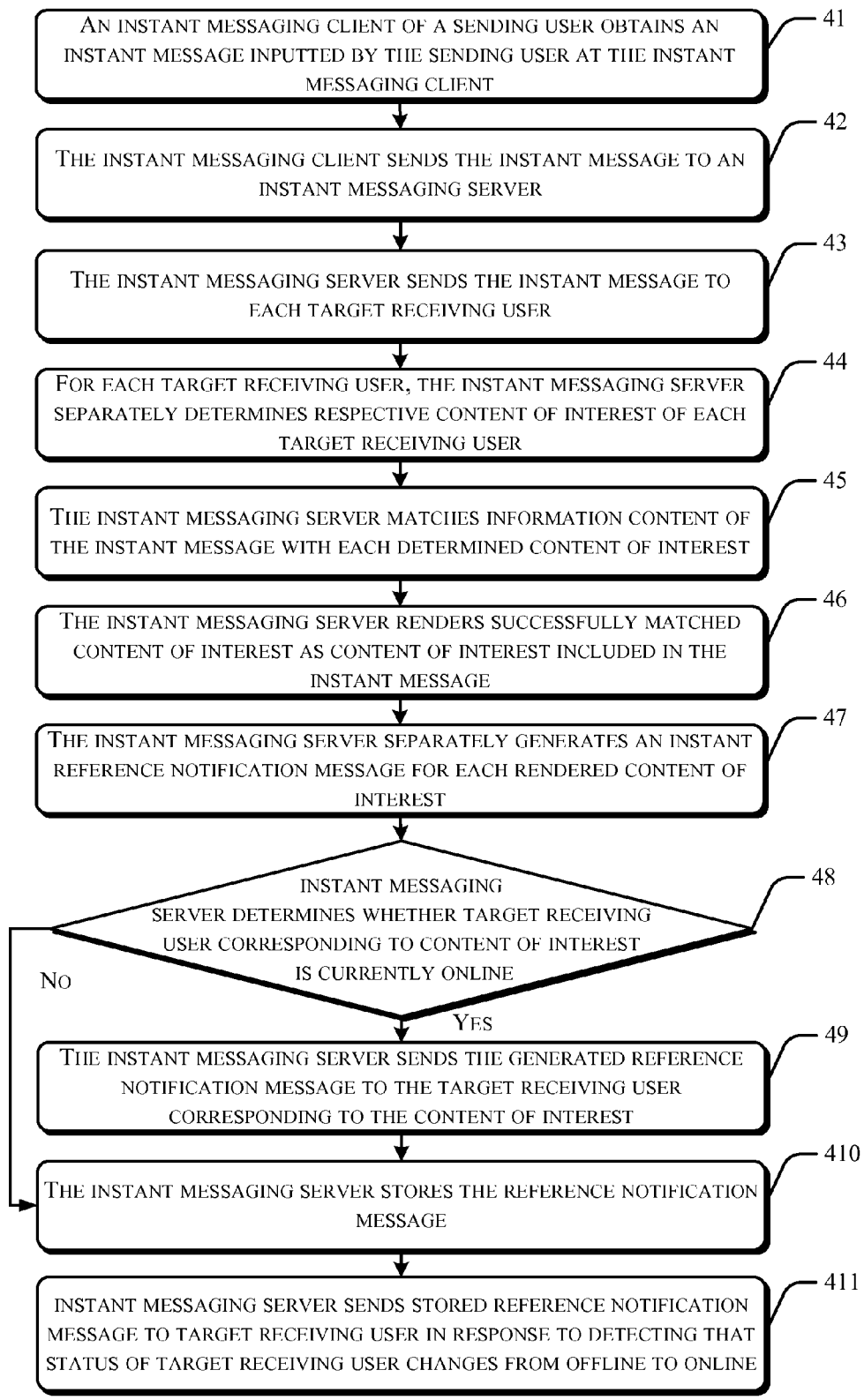
FIG. 4 is a flowchart illustrating a method of reference notification in accordance with a fourth embodiment of the present disclosure.

FIG. 3 shows a flowchart illustrating a method of reference notification for a situation in which the execution entity is an instant messaging client of a sending user, and contacts that satisfy a predetermined criterion correspond to contacts in a buddy list of the sending user who sends an instant message.

At block 31, an instant messaging client of a sending user obtains an instant message inputted by the sending user at the instant messaging client.

At block 32, the instant message is sent to an instant messaging client of each target receiving user.

At block 33, for each contact of a buddy list of the sending user, a respective content of interest of each contact is determined.

At block 34, information content of the instant message is separately matched with each determined content of interest.

At block 35, successfully matched content of interest is rendered as content of interest included in the instant message.

At block 36, a respective instant reference notification message is separately generated for each rendered content of interest. The reference notification message is used for notifying a contact that corresponding content of interest is referenced. The reference notification message includes a user identifier of the sending user, an information identifier of the instant message, a sending time of the instant message, an entire text of the instant message, and a messaging identifier corresponding to the instant message.

At block 37, a determination is made as to whether a contact corresponding to the content of interest is currently online. If a determination result is affirmative, the process proceeds to block 38. If the determination result is negative, the process proceeds to block 39.

At block 38, the generated reference notification message is sent to the contact corresponding to the content of interest.

At block 39, the reference notification message is stored in an instant messaging server.

At block 310, in response to detecting that a status of the contact changes from offline to online, the instant messaging server sends the stored reference notification message to an instant messaging client of the contact.

The instant messaging client may send the instant message or the reference notification message to other users directly or through the instant messaging server.

Since an instant messaging client completes both the determination of content of interest included in an instant message and the generation of a reference notification message, processing resources of an instant messaging server can be saved effectively.

Fourth Embodiment

FIG. 3 shows a flowchart illustrating a method of reference notification for a situation in which the execution entity is an instant messaging client of a sending user, and contacts that satisfy a predetermined criterion correspond to target receiving users who receives an instant message.

At block 41, an instant messaging client of a sending user obtains an instant message inputted by the sending user at the instant messaging client.

At block 42, the instant messaging client sends the instant message to an instant messaging server.

At block 43, the instant messaging server sends the instant message to each target receiving user.

At block 44, for each target receiving user, the instant messaging server separately determines respective content of interest of each target receiving user.

At block 45, the instant messaging server matches information content of the instant message with each determined content of interest.

At block 46, the instant messaging server renders successfully matched content of interest as content of interest included in the instant message.

At block 47, the instant messaging server separately generates an instant reference notification message for each rendered content of interest. The reference notification message is used for notifying a contact that corresponding content of interest is referenced. The reference notification message includes a user identifier of the sending user, an information identifier of the instant message, a sending time of the instant message, an abstract of the instant message, and a messaging identifier corresponding to the instant message.

At block 48, the instant messaging server determines whether a target receiving user corresponding to the content of interest is currently online. If a determination result is affirmative, the process proceeds to block 49. If the determination result is negative, the process proceeds to block 410.

At block 49, the instant messaging server sends the generated reference notification message to the target receiving user corresponding to the content of interest.

At block 410, the instant messaging server stores the reference notification message.

At block 411, the instant messaging server sends the stored reference notification message to the target receiving user in response to detecting that a status of the target receiving user changes from offline to online.

Fifth Embodiment

Figure 5:
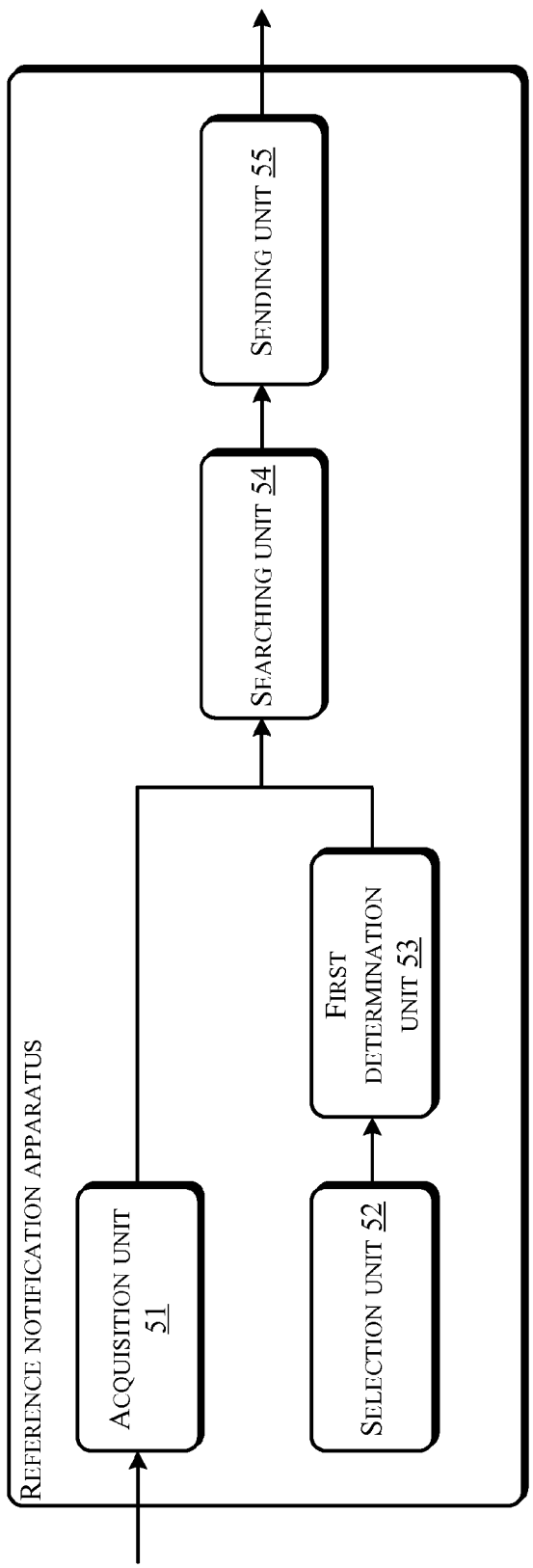
FIG. 5 is a structural diagram illustrating an apparatus of reference notification in accordance with a fifth embodiment of the present disclosure.

Correspondingly, FIG. 5 shows a reference notification apparatus in accordance with the fifth embodiment of the present disclosure. The apparatus may include an acquisition unit 51, a selection unit 52, a first determination unit 53, a searching unit 54 and a sending unit 55.

In one embodiment, the acquisition unit 51 is used for obtaining an instant message that is sent from a sending user. The selection unit 52 is used for selecting a contact that satisfies a predetermined criterion from contacts of the sending user. The first determination unit 53 is used for determining, for the contact selected by the selection unit 52, content that is of interest to the contact. The searching unit 54 is used for finding content of interest included in the instant message obtained by the acquisition unit 51 based on the content determined by the first determination unit 53. The sending unit 55 is used for sending to, a contact corresponding to the found content of interest, a reference notification message for notifying that the content of interest is referenced based on the content of interest found by the searching unit 54.

In some embodiments, the selection unit 52 may include a first determination sub-unit and a second determination sub-unit. The first determination sub-unit is used for determining each target receiving user who receives the instant message. The second determination sub-unit is used for rendering each target receiving user determined by the first determination sub-unit as a contact that satisfies the predetermined criterion.

In one embodiment, the searching unit 54 may include a matching sub-unit and a third determination sub-unit. The matching sub-unit is used for separately matching information content of the instant message that is obtained by the acquisition unit 51 with the determined content of interest determined by the first determination unit 53. The third determination sub-unit is used for rendering content of interest successfully matched by the matching sub-unit as content of interest included in the instant message obtained by the acquisition unit 51.

In one embodiment, the reference notification apparatus may further include a judging unit and a second determination unit. The judging unit is used for determining, for each content of interest found by the searching unit 54, whether a contact corresponding to the respective content of interest is a target receiving user of the instant message. The second determination unit is used for determining, for each content of interest found by the searching unit 54, if a determination result of the judging unit is negative, determining that the instant message includes a predetermined character that is adjacent to the respective content of interest.

In some embodiments, the sending unit 55 may include a first judging sub-unit, a first sending sub-unit and a first storage sub-unit. The first judging sub-unit is used for determining, for the content of interest found by the searching unit 54, whether a contact corresponding to the content of interest is currently online. The first sending sub-unit is used for sending the reference notification message to the contact if a determination result of the first judging sub-unit is affirmative. The first storage sub-unit is used for storing the reference notification message in an instant messaging server if the determination result of the first judging sub-unit is negative.

Furthermore, in one embodiment, the sending unit 55 may include a second judging sub-unit, a second sending sub-unit, a second storage sub-unit, a detection sub-unit and a third sending sub-unit. The second judging sub-unit is used for determining, for the content of interest found by the searching unit 54, whether a contact corresponding to the content of interest is currently online. The second sending sub-unit is used for sending the reference notification message to the contact if a determination result of the second judging sub-unit is affirmative. The second storage sub-unit is used for storing the reference notification message in an instant messaging server if the determination result of the second judging sub-unit is negative. The detection sub-unit is used for detecting a status of the contact if the determination result of the second judging sub-unit is negative. The third sending sub-unit is used for sending the reference notification message that is stored by the storage sub-unit to the contact when the detection sub-unit detects that the status of the contact changes from offline to online.

In some embodiments, the third sending sub-unit may include a determination module, incorporating combination module and a sending module. The determination module is used for determining each reference notification message to be sent to the contact when the detection sub-unit detects that the status of the contact changes from online to offline. The combination module is used for combining determined each reference notification message that is determined by the determination module together. The sending module is used for sending a combined reference notification message that has been processed by the combination module to the contact.

One skilled in the art should understand that the exemplary embodiments of the present disclosure can be provided as methods, apparatuses (devices), or computer program products. Therefore, the present disclosure may be implemented in terms of hardware only, software only, or a combination of hardware and software. Furthermore, the present disclosure may be implemented in a form of a computer program product having one or more computer storage media including computer-executable instructions (including, but not limited to, disk storage, CD-ROM, optical disks, etc.).

The present disclosure is described with reference to flowcharts and/or block diagrams of the exemplary method, apparatus (device) and computer program product. It should be understood that each flow and/or block and a combination of flows and/or blocks of the flowcharts and/or block diagrams may be implemented by computer program instructions. These computer program instructions may be provided to general computers, specialized computers, embedded processors or other programmable data processors to generate a machine, in order to create an apparatus implementing designated functions within one or more flows of the flowcharts and/or one or more blocks of the block diagrams through executing instructions by a computer or other programmable data processors.

These computer program instructions may alternatively be stored in computer-readable storage which can instruct a computer or other programmable data processors to operate in a specific way, so that the instructions stored in the computer-readable storage generate a product including an instruction apparatus. The instruction apparatus implements designated functions in one or more flows of the flowcharts and/or one or more blocks of the block diagrams.

These computer program instructions may alternatively be loaded in a computer or other programmable data processors, so that the computer or other programmable data processors can perform a series of acts to generate a computer-implemented process. Accordingly, instructions executed in the computer or other programmable data processors can provide acts for implementing designated functions in one or more flows of the flowcharts and/or one or more blocks of the block diagrams.

Figure 6:
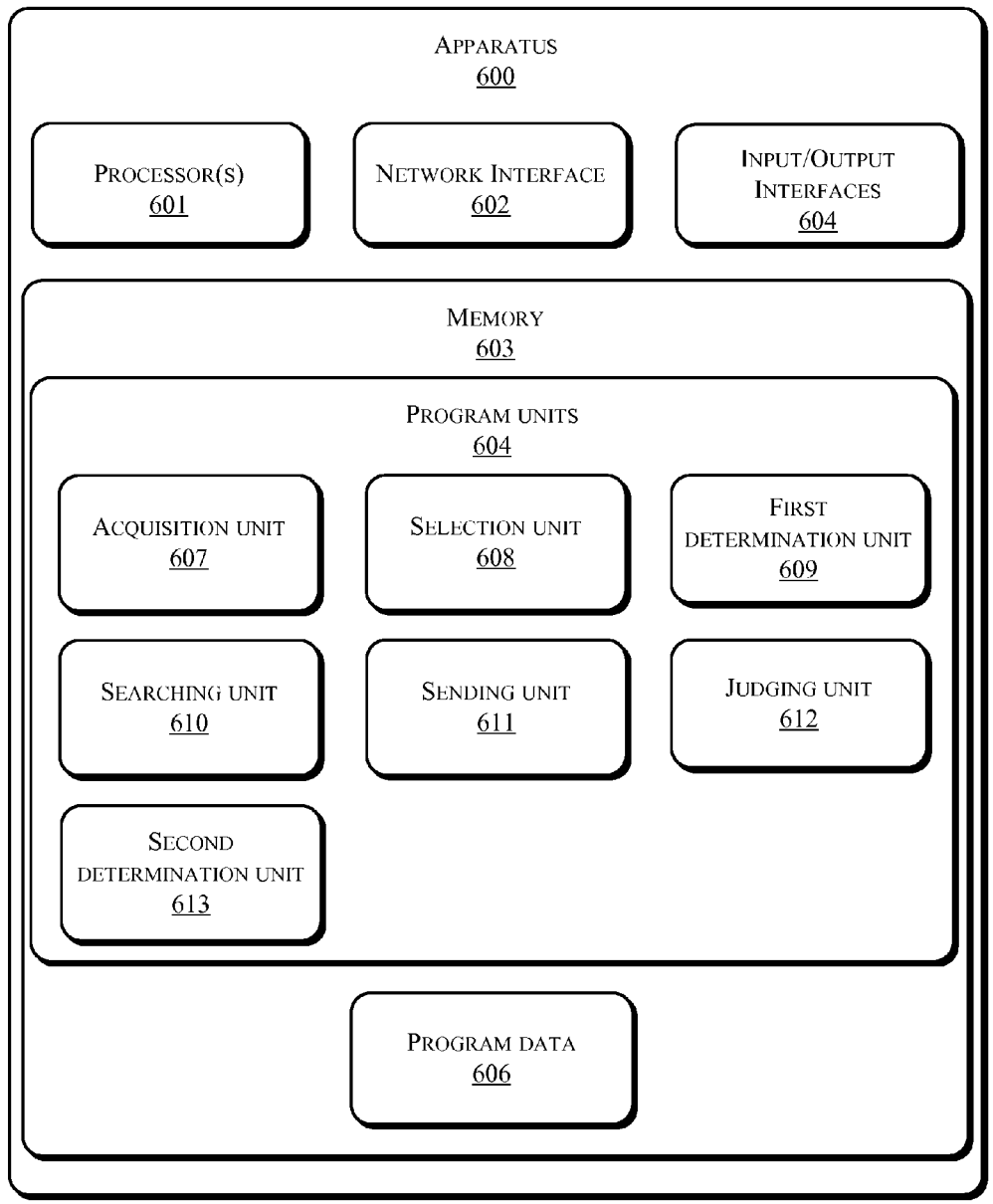
FIG. 6 is a schematic diagram illustrating the exemplary apparatus described in FIG. 5 in more detail.

For example, FIG. 6 illustrates an exemplary apparatus 600, such as the apparatus as described above, in more detail. In one embodiment, the apparatus 600 can include, but is not limited to, one or more processors 601, a network interface 602, memory 603, and an input/output interface 604.

The memory 603 may include computer-readable media in the form of volatile memory, such as random-access memory (RAM) and/or non-volatile memory, such as read only memory (ROM) or flash RAM. The memory 603 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 603 may include program units 605 and program data 606. In one embodiment, the program units 605 may include an acquisition unit 607, a selection unit 608, a first determination unit 609, a searching unit 610 and a sending unit 611. In one embodiment, the program unit 605 may further include a judging unit 612 and a second determination unit 613. Details about these program units and any sub-units and/or modules thereof may be found in the foregoing embodiments described above.

Although preferred embodiments of the present disclosure are described, one skilled in the art can perform additional alterations and modifications to these embodiments once understanding the fundamental creative concept. Accordingly, it is intended that the claims cover all modifications and variations which fall within the scope of the claims of the present disclosure and preferred embodiments. One skilled in the art can alter or modify the disclosed method, system and apparatus in many different ways without departing from the spirit and the scope of this disclosure. It is intended that the present disclosure covers all modifications and variations which fall within the scope of the claims of the present disclosure and their equivalents.

What is claimed is:

1. A method implemented by one or more computing devices, the method comprising:
selecting a contact from multiple contacts of a user associated with an instant message;
finding, in the instant message, content that is determined to be of interest to the selected contact; and
sending a reference notification message to the selected contact, the reference notification message referencing the content that is determined to be of interest to the selected contact.

2. The method as recited in claim 1, wherein the selecting the contact from the multiple contacts of the user associated with the instant message comprises:
determining a target receiving user who receives the instant message; and
rendering the target receiving user as the contact.

3. The method as recited in claim 1, wherein the content that is determined to be of interest comprises at least one of:
a user identifier of the selected contact;
a user identifier of a user of interest to the selected contact; or
a keyword of interest to the selected contact.

4. The method as recited in claim 1, wherein finding the content that is determined to be of interest to the selected contact comprises:
determining, for the selected contact, content that is of interest to the selected contact;
matching information content of the instant message with at least a portion of the content that is determined to be of interest to the selected contact; and
rendering the matched information content as the content that is determined to be of interest to the selected contact.

5. The method as recited in claim 1, wherein prior to the sending the reference notification message to the selected contact, the method further comprises:
determining that the selected contact is not a receiving user of the instant message; and
determining that the instant message includes a predetermined character adjacent to at least a portion of the content that is determined to be of interest.

6. The method as recited in claim 1, wherein the sending the reference notification message to the selected contact comprises:
determining that the selected contact is currently offline; and
storing the reference notification message in an instant messaging server.

7. The method as recited in claim 1, wherein the sending the reference notification message to the selected contact comprises:
determining that the selected contact is currently offline;
storing the reference notification message in an instant messaging server; and
sending the reference notification message to the selected contact in response to detecting that a status of the selected contact changes from offline to online.

8. The method as recited in claim 7, wherein the sending the reference notification message to the selected contact in response to detecting that the status of the contact changes from offline to online comprises:
in response to detecting that the status of the contact changes from offline to online, determining, from stored reference notification messages, reference notification messages to be sent to the selected contact;

combining the reference notification messages to generate a combined reference notification message; and sending the combined reference notification message to the selected contact.

9. The method as recited in claim 1, wherein the reference notification message comprises at least one of: content information of the instant message, or attribute information of the instant message.

10. The method as recited in claim 9, wherein the content information of the instant message comprises at least one of: an entire text of the instant message, or an abstract of the instant message.

11. The method as recited in claim 9, wherein the attribute information of the instant message comprises at least one of:
   the content that is determined to be of interest;
   a user identifier of the user;
   an information identifier of the instant message;
   a sending time of the instant message; or
   a messaging identifier corresponding to the instant message.

12. The method as recited in claim 11, wherein if the instant message is a chat instant message for an instant chat, the messaging identifier corresponding to the instant message is a chat identifier of the instant chat, and if the instant message is a group instant message for a messaging group, the message identifier corresponding to the instant message is a group identifier of the messaging group.

13. A reference notification apparatus comprising:
   one or more processors;
   memory communicatively coupled to the one or more processors;
   a selection unit stored in the memory and executable by the one or more processors that is configured to select a contact from contacts of a user associated with an instant message;
   a searching unit stored in the memory and executable by the one or more processors that is configured to find, in the instant message, content that is determined to be of interest to the selected contact; and
   a sending unit stored in the memory and executable by the one or more processors that is configured to send a reference notification message referencing the content that is determined to be of interest to the selected contact.

14. The apparatus as recited in claim 13, wherein the selection unit configured to select the contact from the multiple contacts of the user associated with the instant message comprises:
   a first determination sub-unit configured to determine a target receiving user who receives the instant message; and
   a second determination sub-unit configured to render the target receiving user as the contact.

15. The apparatus as recited in claim 13, wherein the searching unit configured to find the content that is determined to be of interest to the selected contact comprises:
   a matching sub-unit configured to match information content of the instant message with at least a portion of the content that is determined to be of interest to the selected contact; and
   a third determination sub-unit configured to render the matched information content as the content that is determined to be of interest to the selected contact.

16. The apparatus as recited in claim 13, further comprising:
   a judging unit configured to determine that the selected contact is a target receiving user of the instant message; and
   a determination unit configured to determine that the instant message includes a predetermined character that is adjacent to at least a portion of the content that is determined to be of interest.

17. The apparatus as recited in claim 13, wherein the sending unit configured to send the reference notification message to the selected contact comprises:
   a first judging sub-unit configured to determine whether the selected contact is currently online;
   a first sending sub-unit configured to send the reference notification message to the selected contact if a determination result of the first judging sub-unit is affirmative; and
   a first storage sub-unit configured to store the reference notification message in an instant messaging server if the determination result of the first judging sub-unit is negative.

18. The apparatus as recited in claim 13, wherein the sending unit comprises:
   a second judging sub-unit configured to determine whether the selected contact is currently online;
   a second sending sub-unit configured to send the reference notification message to the contact if a determination result of the second judging sub-unit is affirmative;
   a second storage sub-unit configured to store the reference notification message in an instant messaging server if the determination result of the second judging sub-unit is negative;
   a detection sub-unit configured to detect a status of the selected contact if the determination result of the second judging sub-unit is negative; and
   a third sending sub-unit configured to send the reference notification message that is stored by the storage sub-unit to the selected contact when the detection sub-unit detects that the status of the selected contact changes from offline to online.

19. The apparatus as recited in claim 18, wherein the third sending sub-unit comprises:
   a determination module configured to determine reference notification messages to be sent to the selected contact when the detection sub-unit detects that the status of the selected contact changes from online to offline;
   a combination module configured to generate a combined reference notification message by combining together the reference notification messages that are determined by the determination module; and
   a sending module configured to send, to the selected contact, the combined reference notification message generated by the combination module.

20. One or more computer-readable media configured with computer-executable instructions that, when executed by one or more processors, configure the one or more processors to perform acts comprising:
   selecting a contact from multiple contacts of a user associated with an instant message;
   finding, in the instant message, content that is determined to be of interest to the selected contact; and
   sending a reference notification message to the selected contact, the reference notification message referencing the content that is determined to be of interest to the selected contact.

* * * * *